No. 813,044. PATENTED FEB. 20, 1906.
P. E. HANSON.
MOTOR VEHICLE.
APPLICATION FILED JUNE 24, 1905.
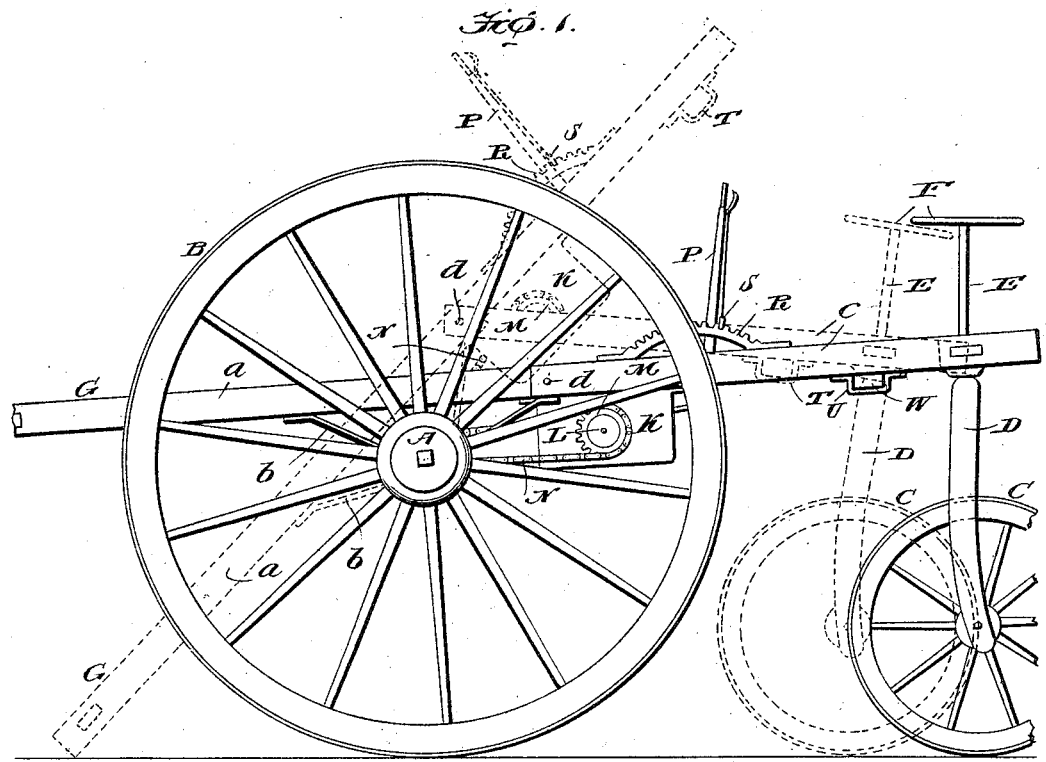
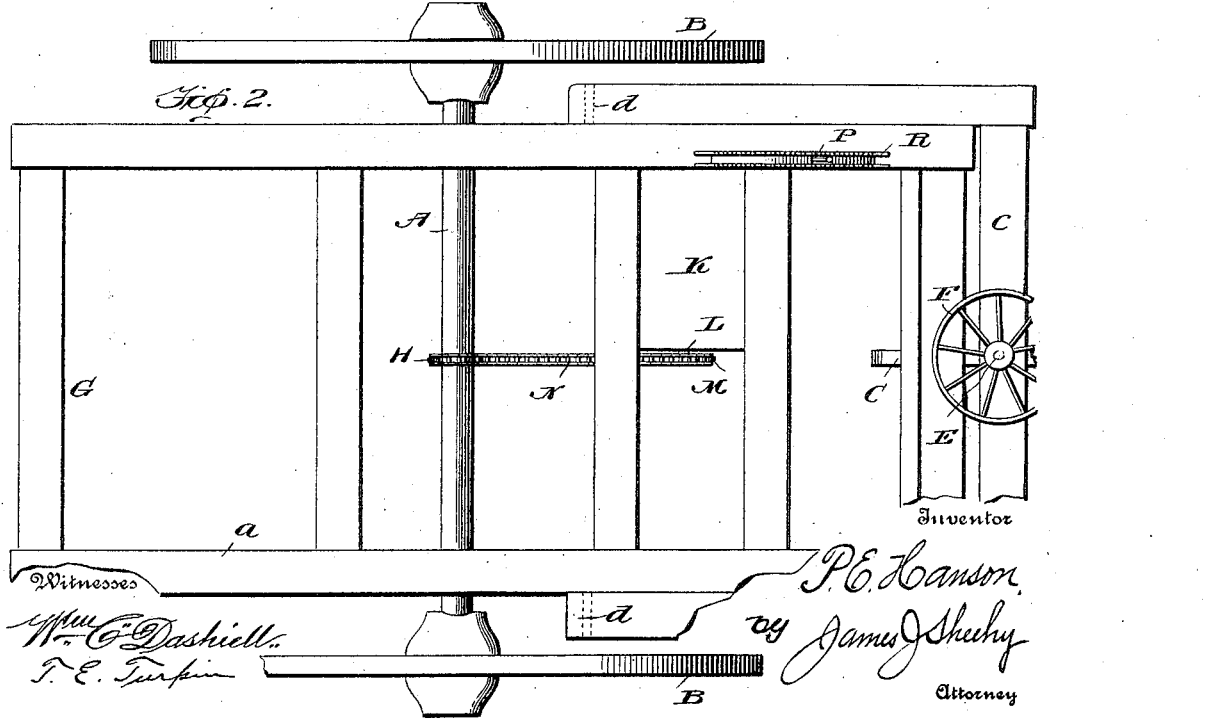

UNITED STATES PATENT OFFICE.

PETER EDWIN HANSON, OF GALVESTON, TEXAS.

MOTOR-VEHICLE.

No. 813,044.  Specification of Letters Patent.  Patented Feb. 20, 1906.

Application filed June 24, 1905. Serial No. 266,782.

*To all whom it may concern:*

Be it known that I, PETER EDWIN HANSON, a citizen of the United States, residing at Galveston, in the county of Galveston and State of Texas, have invented new and useful Improvements in Motor-Vehicles, of which the following is a specification.

My invention pertains to motor-vehicles; and it contemplates the provision of a simple and inexpensive self-propelled dumping-dray and one which may be readily controlled, steered, and discharged of its burden with but a minimum amount of effort on the part of the drayman.

With the foregoing in mind the invention will be fully understood from the following description and claims when taken in connection with the accompanying drawings, forming part of this specification, in which—

Figure 1 is a side elevation of my novel self-propelled dumping-dray, the same being illustrated by full lines in its normal condition and by dotted lines in a condition to dump or discharge its burden. Fig. 2 is a broken plan view of the dray.

Similar letters designate corresponding parts in both views of the drawings, referring to which—

A is the axle of the dray. B B are the wheels borne by and supporting the said axle.

C is a pilot or steering wheel disposed in front of the axle A and carried by a hanger D, which has an upwardly-extending shaft E provided on its upper end with a horizontally-disposed hand-wheel F, and G is the main frame of the dray. The said main frame G comprises a rear section $a$, between which and the axle A conventional or other suitable connections $b$ are interposed, so as to enable the said section to swing vertically after the manner indicated by dotted lines in Fig. 1, and a forward section $c$, having a forward transverse bar in which the before-mentioned shaft E is journaled, and also having rearwardly-extending side bars lapping the forward portions of the side bars of the rear section and pivoted or hinged to said side bars, as indicated by $d$. This pivotal or hinged connection of the forward section $c$ of the main frame to the rear section thereof obviously enables the frame to flex after the manner shown by dotted lines in Fig. 1, so as to facilitate the discharge of a burden from said rear section.

H is a sprocket-gear fixed with respect to the axle A.

K is a casing fixed to the under side of the forward portion of the rear frame-section $a$ and designed to contain one or more storage batteries and an electromotor, which batteries and motor I have deemed it unnecessary to illustrate, inasmuch as they may be of the conventional or any other construction compatible with the purposes of my invention without involving a departure from the scope thereof.

L is the motor-shaft, provided with a sprocket-gear M.

N is a sprocket-belt connecting the gears M and H, so as to transmit motion from the motor to the axle A.

P is a lever mounted on the rear frame-section $a$ and designed to be connected with means (not shown) for controlling—*i. e.,* starting and stopping—the motor, and R is a segmental rack fixed on said frame-section $a$ and designed for the engagement of a detent S, carried by the lever P, so as to adjustably fix said lever in the positions in which it is placed. The lever P and the hand-wheel F are arranged in close proximity, and from this it follows that a drayman standing on the front portion of the frame G is enabled to conveniently determine the course of the dray as well as start and stop the same.

The rear section $a$ of the main frame G is provided on the under side of its forward portion with one or more transverse loops T, (see dotted lines in Fig. 1,) and the forward section $c$ of said frame is provided with one or more similar loops U, as shown by full lines in Fig. 1. When the frame-sections $a$ and $c$ are in the relative positions shown by full lines in Fig. 1 and the loops T and U are alined or registered with each other, a transverse bar W may be readily placed in and as readily removed from the loops. When the bar W is positioned in the loops T and U, as shown by full lines in Fig. 1, the frame-sections $a$ and $c$ will obviously be held in alinement with each other and this without liability of the forward portion of the rear section $a$ being casually released from the forward section $c$. When, however, it is desired to discharge the rear section $a$ of a burden placed thereon, the same may be readily accomplished by withdrawing the bar W and permitting the said rear section to assume the inclined position shown by dotted lines in Fig. 1. When the section *a* assumes the position last stated, the forward section *c* and the pilot-wheel C and the appurtenances of the latter will assume the positions shown by dotted lines in Fig. 1. It will be noticed, however, that when the section *a* is restored to its normal position (shown by full lines in Figs. 1 and 2) such action will carry the frame-section *c* and the wheel C back to their normal positions, and the frame-sections may then be fixed with respect to each other by the placing of the bar W in the registered loops T and U. It will also be noticed that the center of movement of the frame-section *a* is also the center of movement of the casing K, and from this it follows that the vertical swinging movements of the said frame-section will in no way interfere with the driving connection intermediate the motor and the axle A.

In addition to the practical advantages which I have hereinbefore ascribed to my novel dray it will be observed that the dray is strong and durable and is therefore well adapted to withstand the rough usage to which such vehicles are ordinarily subjected.

While I have described the section *a* of the main frame as equipped with an electromotor and an electrogenerator, I do not desire to be understood as confining myself to the same, inasmuch as the said frame-section may be equipped with any suitable type of motor without involving departure from the scope of my invention.

Having described my invention, what I claim, and desire to secure by Letters Patent, is—

1. A self-propelled, dumping-dray comprising an axle provided with and supported by traveling wheels, a main frame having a rear section connected with and arranged to swing vertically on the axle, and also having a forward section hinged to the rear section at a point in advance of the axle, whereby the frame is adapted to flex, means detachably connecting the said frame-sections with a view of retaining the same in alinement with each other, a pilot-wheel carried by the forward frame-section, a motor carried by the rear frame-section, and a driving connection intermediate said motor and the axle.

2. In a self-propelled, dumping-dray, the combination of an axle provided with and supported by traveling wheels, a main frame comprising a rear section connected with and arranged to swing vertically on the axle and having a transverse loop on its forward portion, and a forward section hinged to and lapping the forward portion of the rear section and having a transverse loop arranged to register with that of said rear section, a removable bar occupying said loops of the frame-sections, a hanger having an upwardly-extending shaft journaled in the forward frame-section and provided with a handle, a pilot-wheel carried by said hanger, a motor carried by the rear frame-section and connected with the axle, and means on said rear frame-section for controlling the motor.

In testimony whereof I have hereunto set my hand in presence of two subscribing witnesses.

PETER EDWIN HANSON.

Witnesses:
  HENRY SCHACHT,
  PAUL LOSSON.